July 4, 1972  W. B. GOLDSWORTHY  3,674,601
AUGMENTED CURING OF REINFORCED PLASTIC STOCK
Filed Aug. 7, 1970  2 Sheets-Sheet 1
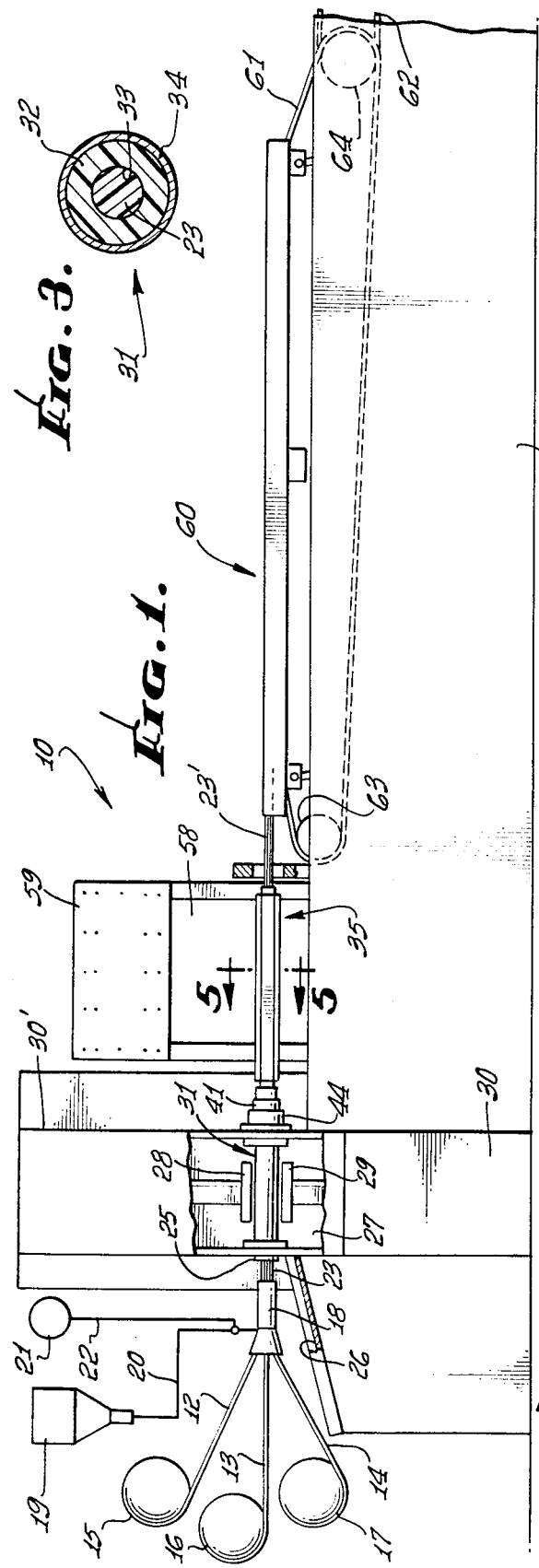
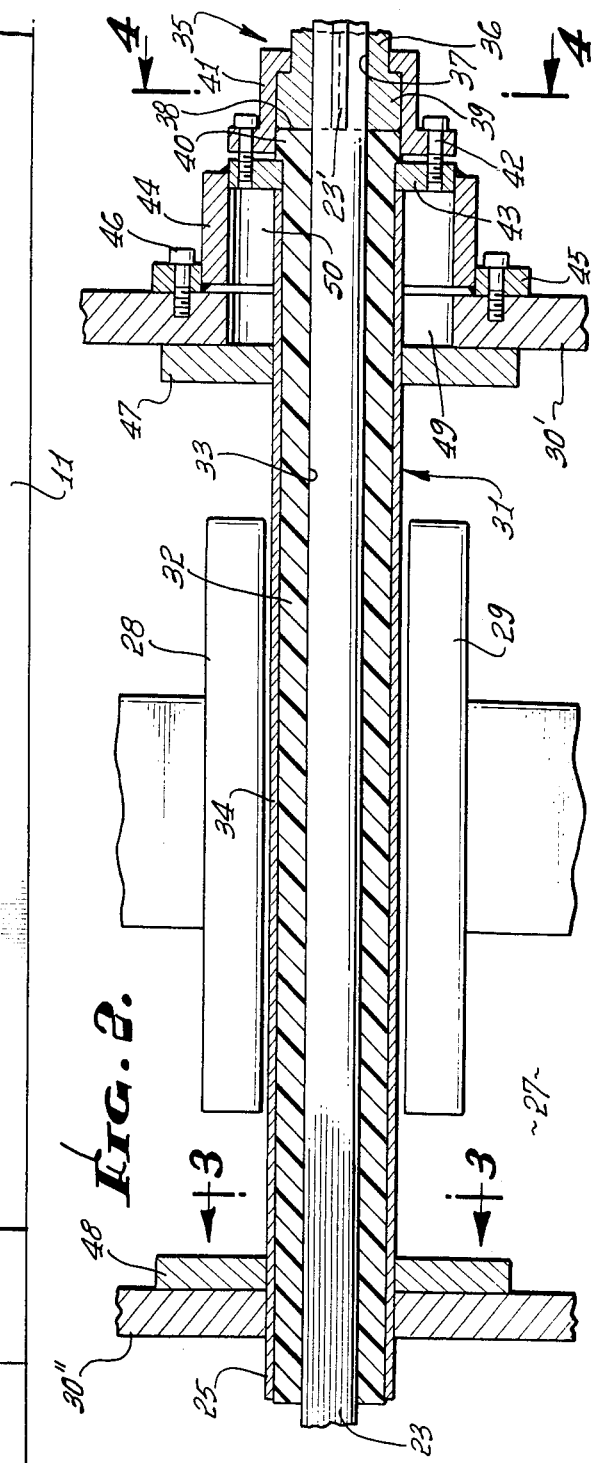
INVENTOR.
WILLIAM BRANDT GOLDSWORTHY
BY Beehler & Arant
ATTORNEYS.

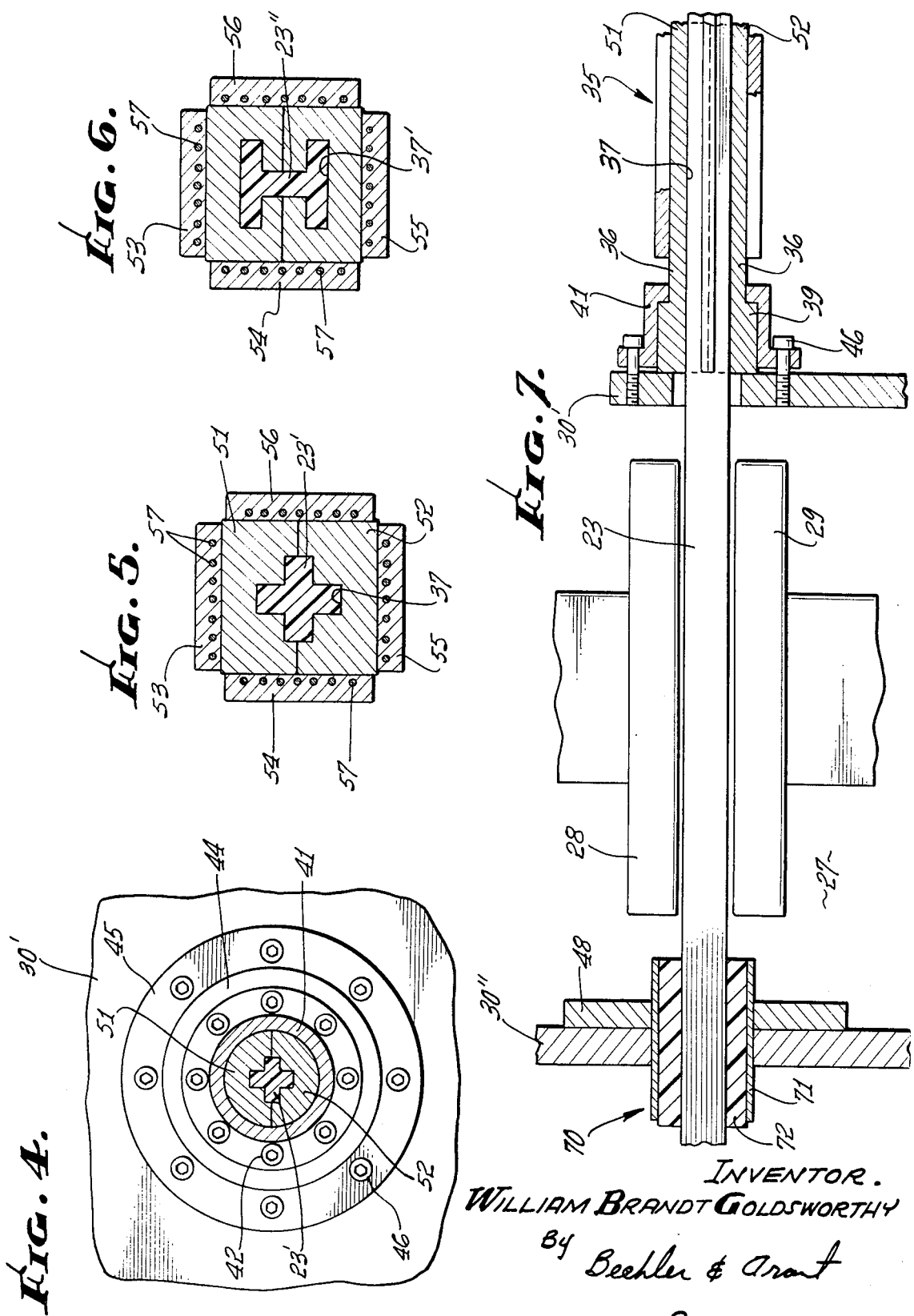

United States Patent Office 3,674,601
Patented July 4, 1972

3,674,601
AUGMENTED CURING OF REINFORCED
PLASTIC STOCK
William Brandt Goldsworthy, Palos Verdes Estates, Calif., assignor to Glastrusions, Inc., Torrance, Calif.
Continuation-in-part of application Ser. No. 648,347, June 23, 1967, now Patent No. 3,556,888. This application Aug. 7, 1970, Ser. No. 61,934
Int. Cl. B29c 19/02; B29h 9/00
U.S. Cl. 156—380
8 Claims

ABSTRACT OF THE DISCLOSURE

A pultrusion machine and process wherein a composite fibre strand is pulled through successive stages of impregnation, curing, and forming. At the impregnation stage liquid thermosetting resin is mixed with hardener and the fiber strand saturated with the mixture and rough formed. During the initial curing stage a cure is started throughout the resin mixture by use of electrical wave energy. Before final curing, the saturated strand is pulled through the finish die where it is externally heated and wherein the saturated strand is given its final cross-sectional shape and external finish, and cured to completion immediately prior to final emergence at the exit end of the finish die.

Prior art treating with the subject of manufacturing resin impregnated Fiberglas strands can be found in Pat. No. 2,871,911.

This application is a continuation-in-part of copending application Ser. No. 648,347, filed June 23, 1967, now Pat. No. 3,556,888.

The applications referred to above undertake to make use of dielectric heating in a general way for curing the catalyzed thermosetting resin which impregnates the fiber glass roving, these procedures have been improved in a distinct fashion by the later filed patent applications which specifically disclose the employment of radio frequencies in the range of 45 to 500 megahertz or in the alternative microwave energy within the bands of 950 to 5,200 megahertz. By using such electrical wave energy starters for curing the catalyzed resin, the cure can be started simultaneously throughout the entire cross-section of the as yet uncured catalyzed stock and thus appreciably speed up and improve the curing process in a continuous flow machine.

Use of electrical energy in the wave bands made reference to presents certain problems, primarily in the requirement for a die of special construction through which the saturated strands of fiber pass while the curing takes place. Such dies cannot be made of metal and have had to be made of a special low electrical loss material such as some particular thermosetting resin compound of the nature of Teflon. Even when such materials can be found capable of permitting the wave energy to properly pass through the die without heating up the die itself thereby to start the cure, such materials have a limited life resulting from wear on the surface and have needed regular and constant replacement. A related limitation is the difficulty in maintaining positive dimensions due to progressive wear on the interior of the die which changes its size.

Although in other fields steel die tubes have been employed for the curing of catalyzed thermosetting resin, such die tubes have of necessity been heated on the exterior thereby to start the cure on the exterior of the catalyzed resin which, as a consequence, requires additional steps to be certain that the catalyzed stock is cured completely through the cross-sectional area prior to completion. Such exteriorly heated steel die tubes are capable only of very slow speed operation and the limit thus imposed on the process has been a tremendous handicap. Even though steel or comparable metal die tubes do have the capability of sustaining their dimensional shape and size, the difficulties encountered in the prior art have placed a limit not only on speed of operation but also on the cross-sectional limitations of the cured stock.

It is therefore among the objects of the invention to provide a new and improved method and apparatus for producing fiber impregnated thermosetting stock wherein the finished stock can be virtually of any profile and any distribution of mass throughout the profile.

Another object of the invention is to provide a new and improved method and machine for continuously producing fiber impregnated plastic stock wherein dimensional stability can be maintained in the stock irrespective of the complexity of the cross-sectional shape.

Still another object of the invention is to provide a new and improved method and apparatus for continuously producing fiber impregnated plastic stock wherein the exterior finish is under dependable control at all times.

Still another object of the invention is to provide a new and improved method and apparatus for producing fiber impregnated plastic stock wherein the die life of the finished die is virtually infinite, thereby to greatly improve the running rate of the stock and reduce the cost of such stock sufficient to make it competitive with metallic extrusions.

Also included among the objects of the invention is to provide a new and improved method and apparatus for the continuous production of fiber impregnated plastic stock which employs the advantages both of low electrical loss material for a first stage of cure followed by high heat conducting metallic material for a final finished stage die in such fashion that the running rate of the stock is far above anything heretofore possible and in a dependable combination such that great economies can be effected in the operation.

With these and other objects in view, the invention consists of the construction, arrangement, and combination of the various parts of the device and the method, whereby the objects contemplated are attained, as hereinafter set forth, pointed out in the appended claims and illustrated in the accompanying drawings.

In the drawings:

FIG. 1 is a side elevational view of a machine capable of employing the method with portions of the process shown schematically.

FIG. 2 is a longitudinal sectional view of the first curing stage portion of the device.

FIG. 3 is a cross-sectional view on the line 3—3 of FIG. 2.

FIG. 4 is a cross-sectional view of the line 4—4 of FIG. 2.

FIG. 5 is a cross-sectional view somewhat similar to FIG. 4 showing additional details.

FIG. 6 is a cross-sectional view similar to FIG. 5 but showing a different cross-sectional shape.

FIG. 7 is a longitudinal sectional view similar to the view of FIG. 2 but showing a second form of the invention.

In an embodiment of the invention chosen for the purpose of illustration there is shown a pultrusion machine indicated generally by the reference character 10, consisting of a bed 11 upon which the various portions of the apparatus are mounted. Fiber glass rovings are fed from respective rolls 15, 16, and 17 to a composing tube 18. A liquid thermosetting resin material is fed from a reservoir 19 through a feed line 20 to the composing tube 18. Simultaneously, liquid hardener from a reservoir 21 is fed through a feed line 22 either into the feed line 20, as shown, or directly into the composing tube 18 in a fashion such that a suitable amount of the hardener, namely a catalyst, is fed and mixed with the resin and the liquid mixture thus formed impregnates and saturates the rovings 12, 13, and 14 in the composing tubes such that a saturated strand of rovings 23 emerges from the composing tube and passes to a starter die 25 where any surplus liquid mixture can be squeezed from the saturated strand 23 and permitted to flow back through a return 26 to a suitable location where it can be either reused or disposed of.

A first curing stage for the saturated strand 23 is at the location of a chamber 27 which can be construed as the succeeding step in the process following a composing stage in the composing tube 18. In the chamber 27 are electrodes 28 and 29, the action of which is appropriately shielded by walls 30 of the chamber 27. Also in the chamber 27 is a forming die tube indicated generally by the reference character 31 and which consists of an inner tube 32 which is of some low electrical loss material, such for example as Teflon, having a central passage 33 and an outer tube 34 surrounding the inner tube. The outer tube 34 is there primarily for stiffness and being of a relatively thin material the precise composition is optional.

Downstream with reference to the direction of movement of the saturated strand 23 is a second finish die, indicated generally by the reference character 35, connecting portions of which are shown in FIG. 2 and some additional details of which are shown in FIG. 7. The fiinish die is also a composite construction consisting primarily of a die tube 36 which is of metal and which can be either steel, beryllium copper, aluminum, or other good heat conducting metal.

Since the respective central passages 33 and 37 must provide an uninterrupted flow path for the saturated strand at an important stage in the process, the two separate tubes 32 and 36 must be connected at a joint 38 which is liquid-tight. To accomplish this in the embodiment of the invention shown, the die tube 36 is provided with a collar 39 and a similar collar 40 is provided on the adjacent end of the inner tube 32, facing portions of which are brought into snug engagement to form the joint 38. To accomplish this a clamp 41 engages over the collar 39 on one side and is bolted by means of cap screws 42 to a flange 43 which engages the collar 40. The flange 43 is welded to a sleeve 44, in turn having a flange 45 which by means of cap screws 46 is anchored to a wall 30', which is one of the walls surrounding the chamber 27.

Within the chamber 27 are reinforcing plates 47 and 48 which assist in the mounting of the finish die 35. An opening 49 in the wall 30' is in axial alignment with an opening 50 within the sleeve 44.

As shown in FIG. 5, the finish die 35 is made up of two die halves 51 and 52 each of which provide half of the central passage 37, which may be in the form of a cross as shown in FIG. 5, an H-section 37' as shown in FIG. 6, or virtually any other cross-section, either simple or complex, and possessed of their relatively thin-walled sections, relatively thick-walled sections, or a combination of the two.

Surrounding the die halves are heating pads 53, 54, 55, and 56, which in the chosen embodiment employ electric resistance wires 57 for heating up the pads and in consequence heating up the die halves from the exterior. Other known and acceptable external heating means may also be used. The last described portion of the device which may also be referred to as a final cure or finish cure station may for convenience and effectiveness be located in a chamber 58 in a suitable box 59, mounted upon the bed 11.

For moving the saturated strand 23 through the operation an appropriate pull mechanism 60 is employed. Details of a typical and suitable pull mechanism are disclosed in some particular in applicant's co-pending application, Ser. No. 648,347 filed June 23, 1967 now Pat. No. 3,556,888.

The saturated strand 23 which has now become a cured strand 23' is grasped by the pull mechanism 60 and, as provided for in the pull mechanism, is constantly pulled through the process at a selected continuous and steady rate, the pull mechanism being powered by suitable chains 61 and 62 passing over pulleys 63 and 64.

In the embodiment of the invention illustrated in FIG. 7, no forming die tube is employed in the chamber 27 and wave energy from the electrodes 28 and 29 passes directly to the saturated strand 23. In order to create the strand 23 there is provided a starter die, indicated generally by the reference character 70, located in a wall 30'', the starter die consisting of an outer shell 71 of appropriate material and an inner die tube 72 of material comparable to the inner tube 32 heretofore described.

In a dual die combination such as that herein described, the central passage 33 in the forming die need not have the precisely required finished size or even the finished shape inasmuch as the cure which is started by the wave energy in the forming die tube is not carried to completion until the saturated strand 23 passes through the finish die 35. As shown, for example in the chosen embodiment FIG. 3, the form of the saturated strand 23 may be circular and may be changed to the configuration of a cross by the finish die 35. In other words, the rate of passage of the saturated strand may be so timed to the rate of curing initiated by the wave energy that the catalyzed resin in the saturated strand instead of being completely cured in the chamber 27 is only partially cured and in a semi-soft state when passed through the finish die 35 can be reformed and also can be sized precisely to the size it will have when completely cured and hardened. At the same time, due to the fact that the finish die is a steel die, a finished surface will be applied to the exterior of the cured stock in the finish stage of the operation. Further still, inasmuch as the cure is in fact started throughout the entire area of the saturated strand, due to the exothermic action, the center will be slightly hotter and hence the hardening will commence at the center and work toward the exterior. Under such circumstances, such gases as may be created by the reaction readily pass outwardly and leave the saturated strand, a condition which would not be present should the strand be cured by external heat which causes the formation of a skin on the exterior initially thereby to prevent the expulsion of gas.

In the chosen embodiment also wherein a dual die structure is possible, the forming die, instead of being of a thermoplastic material, such for example as Teflon, may be one or another of the polyimides or even may be of a ceramic material inasmuch as the interior dimension of the passage through the forming die is not critical under circumstances where a finish die is depended upon for the final size of the cured stock.

Some circumstances may also exist where the exothermic reactions initiated by the wave energy in the forming die will carry through as the saturated strand passes through the finish die generating enough heat so that external heating pads, like the pads 53, 54, 55, and 56 may be dispensed with while still enjoying the advantages of a steel or other metallic finish die.

While the invention has herein been shown and described in what is conceived to be a practical and effective embodiment, it is recognized that departures may be made therefrom within the scope of the invention, which is not to be limited to the details disclosed herein but is to be accorded the full scope of the claims so as to embrace any and all equivalent devices.

Having described the invention what is claimed in support of Letters Patent is:

1. An augmented curing former comprising
a frame,
a composing die,
material supplies for said composing die, including fiber strands, thermosetting resin and hardener forming a continuous strand of impregnated stock, a primary heating station including a pathway for said stock and comprising an electrically shielded chamber and a set of high frequency electrodes in said chamber adjacent said pathway.

a secondary hardening station comprising a finish die having a passage therethrough in alignment with said pathway, said finish die being out of the influence of said electrodes and having a mating end in liquid-tight relationship with said heating station at an exit end of said pathway, and pull means adjacent the downstream end of said finish die adapted to engage said stock and to pull said stock from the finish die.

2. An augmented curing former as in claim 1 wherein said primary heating station comprises a die tube having a liner of material selected from a group consisting of thermosetting plastic, thermoplastic plastic and ceramic, and having the characteristic of low electrical loss material.

3. An augmented curing former as in claim 1 wherein said finish die is of relatively high heat conducting metal and said finish die is anchored with a liquid-tight joint endwise against said tube of the primary heating station.

4. An augmented curing former as in claim 2 wherein the low electrical loss material is fluorocarbon.

5. An augmented curing former as in claim 2 wherein the low electrical loss material is a polyimide.

6. An augmented curing former as in claim 2 wherein the low electrical loss material is a high alumina ceramic.

7. An augmented curing former as in claim 1 wherein the finish die is an externally heated die.

8. An augmented curing former as in claim 1 wherein said finish die has a die forming unit receptive of said stock in one form and shape different at the outlet end whereby to pass said stock in a finish die formed shape to a completed stock delivery station.

References Cited
UNITED STATES PATENTS

| | | | |
|---|---|---|---|
| 2,822,575 | 2/1958 | Imbert et al. | 156—380 |
| 2,871,911 | 2/1959 | Goldsworthy et al. | 156—441 |
| 3,400,032 | 9/1968 | Sexstone et al. | 156—380 |
| 3,586,574 | 6/1971 | Soda et al. | 156—380 |

DOUGLAS J. DRUMMOND, Primary Examiner

U.S. Cl. X.R.

156—441